(12) United States Patent
Kim et al.

(10) Patent No.: US 12,428,540 B2
(45) Date of Patent: Sep. 30, 2025

(54) CITRATE-BASED PLASTICIZER COMPOSITION AND RESIN COMPOSITION COMPRISING THE SAME

(71) Applicant: LG CHEM, LTD., Seoul (KR)

(72) Inventors: Hyun Kyu Kim, Daejeon (KR); Jeong Ju Moon, Daejeon (KR); Joo Ho Kim, Daejeon (KR); Seok Ho Jeong, Daejeon (KR); Woo Hyuk Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 567 days.

(21) Appl. No.: 17/928,833

(22) PCT Filed: Aug. 6, 2021

(86) PCT No.: PCT/KR2021/010406
§ 371 (c)(1),
(2) Date: Nov. 30, 2022

(87) PCT Pub. No.: WO2022/035140
PCT Pub. Date: Feb. 17, 2022

(65) Prior Publication Data
US 2023/0174744 A1    Jun. 8, 2023

(30) Foreign Application Priority Data
Aug. 10, 2020  (KR) .......................... 10-2020-0100049

(51) Int. Cl.
*C08K 5/11*  (2006.01)
*C08K 5/00*  (2006.01)
*C08L 101/00*  (2006.01)

(52) U.S. Cl.
CPC .............. *C08K 5/11* (2013.01); *C08K 5/0016* (2013.01); *C08L 101/00* (2013.01); *C08K 2201/014* (2013.01)

(58) Field of Classification Search
None
See application file for complete search history.

(56) References Cited

U.S. PATENT DOCUMENTS

| | | |
|---|---|---|
| 2002/0111508 A1 | 8/2002 | Bergrath et al. |
| 2002/0198402 A1 | 12/2002 | Bohnen et al. |
| 2011/0046283 A1 | 2/2011 | Grass et al. |
| 2017/0081501 A1 | 3/2017 | Kim et al. |
| 2018/0163018 A1 | 6/2018 | Kim et al. |
| 2018/0171103 A1 | 6/2018 | Kim et al. |
| 2020/0270196 A1 | 8/2020 | Kim et al. |
| 2022/0195143 A1 | 6/2022 | Kim et al. |
| 2022/0227961 A1 | 7/2022 | Kim et al. |

FOREIGN PATENT DOCUMENTS

| | | | |
|---|---|---|---|
| CN | 103113617 A | 5/2013 | |
| EP | 3211029 A1 | 8/2017 | |
| EP | 3604417 A1 | 2/2020 | |
| EP | 3950804 A1 | 2/2022 | |
| EP | 4006091 A1 | 6/2022 | |
| KR | 10-2002-0085812 A | 11/2002 | |
| KR | 10-2016-0095875 A | 8/2016 | |
| KR | 10-2016-0134573 A | 11/2016 | |
| KR | 10-2017-0020282 A | 2/2017 | |
| KR | 10-2018-0039305 A | 4/2018 | |
| KR | 101881646 B1 * | 7/2018 | ........... C07C 69/704 |
| TW | 201806924 A | 3/2018 | |

OTHER PUBLICATIONS

Office Action issued Aug. 20, 2024 for Taiwanese Patent Application No. 11320846070.
"Database WPI Week 201834", 2017, Thomson Scientific, AN 2018-33322F, Clarivate Analytics, XP 002810731, 3 pages total.
Extended European Search Report issued Jan. 12, 2024 for European Patent Application No. 21856146.2.
International Search Report (with partial translation) and Written Opinion dated Nov. 30, 2021, for corresponding International Patent Application No. PCT/KR2021/010406.

* cited by examiner

*Primary Examiner* — Eli D. Strah
(74) *Attorney, Agent, or Firm* — Morgan, Lewis & Beckius LLP

(57) ABSTRACT

The present invention relates to a plasticizer composition including a lower alkyl-based citrate and a higher alkyl-based citrate simultaneously as citrates, wherein effects are achieved through controlling the ratio of hybrid and non-hybrid types, and the ratio of lower alkyl and higher alkyl, and if the plasticizer composition is applied in a resin, stress resistance and mechanical properties may be maintained to the equal or better levels, balance between migration and loss properties, and plasticization efficiency may be achieved, and light resistance and heat resistance may be markedly improved.

12 Claims, No Drawings

CITRATE-BASED PLASTICIZER COMPOSITION AND RESIN COMPOSITION COMPRISING THE SAME

CROSS-REFERENCE TO RELATED APPLICATIONS

The present application claims the benefit of priority based on Korean Patent Application No. 10-2020-0100049, filed on Aug. 10, 2020, the entire contents of which are incorporated herein by reference.

TECHNICAL FIELD

The present invention relates to a citrate-based plasticizer composition including a hybrid citrate of lower and higher alkyl radicals of the components in the composition, and a resin composition comprising the same.

BACKGROUND ART

Generally, plasticizers are obtained through the reaction of alcohols with polycarboxylic acids such as phthalic acid and adipic acid to form corresponding esters. In addition, considering the internal and external regulations on harmful phthalate-based plasticizers to the human body, studies are being continued on plasticizer compositions which may replace phthalate-based plasticizers such as terephthalate-based, adipate-based and other polymer-based plasticizers.

Meanwhile, regardless of the type of industry including plastisol type of industry of flooring materials, wallpaper, soft and hard sheets, etc., calendaring type of industry, extrusion/injection compound type of industry, and the demand for eco-friendly products is increasing. In order to reinforce the quality properties, processability and productivity of the finished products, a suitable plasticizer is required considering discoloration, migration, mechanical properties, etc.

According to the properties required by the types of industry in various areas of usage, such as tensile strength, elongation rate, light resistance, migration, gelling properties and absorption rate, supplementary materials such as a plasticizer, a filler, a stabilizer, a viscosity decreasing agent, a dispersant, a defoaming agent and a foaming agent are mixed with a PVC resin.

For example, in the case of applying di(2-ethylhexyl) terephthalate (DEHTP) which is relatively cheap and widely used among plasticizer compositions which may be applied to PVC, hardness or sol viscosity was high, absorption rate of a plasticizer was relatively slow, and migration and stress migration were not good.

As improvements on the above limitations, the application of a transesterification product with butanol as a plasticizer, in a composition including DEHTP may be considered. In this case, plasticization efficiency is improved, but volatile loss or thermal stability is inferior and mechanical properties are somewhat degraded, and the improvement of physical properties is required. Accordingly, generally, there is no solution but employing a method compensating the defects through mixing with a second plasticizer at the present time.

However, in the case of applying the second plasticizer, there are drawbacks of generating unexpected defects as follows: the change of the physical properties is hard to predict; the application may become a factor of increasing the unit cost of the product; the improvement of the physical properties is not clearly shown except for specific cases; and problems relating to compatibility with a resin may arise.

In addition, if a material like tri(2-ethylhexyl) trimellitate or triisononyl trimellitate is applied as a trimellitate-based product in order to improve the inferior migration and loss properties of the DEHTP products, migration or loss properties may be improved, but plasticization efficiency may be degraded, and a great deal of the material is required to be injected to provide a resin with suitable plasticization effect, and considering the relatively high unit price of the products, commercialization thereof is impossible.

Accordingly, the development of products for solving the environmental issues of the conventional phthalate-based products or products for improving inferior physical properties of the eco-friendly products for improving the environmental issues of the phthalate-based products is required.

DISCLOSURE OF THE INVENTION

Technical Problem

The present invention provides a plasticizer composition which includes a citrate in which lower and higher alkyl radicals are suitably controlled and combined, thereby maintaining and improving mechanical properties and stress resistance to equal or better levels than the conventional plasticizer and at the same time, markedly improving light resistance and heat resistance, while having suitable balance between migration and loss properties and plasticizer efficiency.

Technical Solution

To solve the tasks, according to an embodiment of the present invention, there is provided a plasticizer composition comprising a citrate-based composition comprising three or more citrates of the following Formula 1, wherein an alkyl group of the citrate is derived from a C4 alcohol and a C6 alcohol, the C4 alcohol comprises one or more selected from the group consisting of n-butanol and isobutanol, and the C6 alcohol comprises one or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentyl methanol:

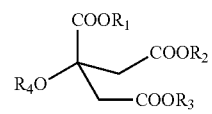

[Formula 1]

in Formula 1, $R_1$ to $R_3$ are each independently an alkyl group of 4 or 6 carbon atoms, and $R_4$ is hydrogen.

In order to solve the tasks, according to another embodiment of the present invention, there is provided a resin composition comprising 100 parts by weight of a resin, and 5 to 150 parts by weight of the plasticizer composition.

The resin may be one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, polylactic acid, natural rubber and synthetic rubber.

Advantageous Effects

The plasticizer composition according to an embodiment of the present invention, if used in a resin composition, may maintain and improve mechanical properties and stress resistance to equal or better levels when compared to the conventional plasticizer, and at the same time, markedly improve physical properties such as migration and light resistance, while having suitable balance between loss properties and plasticization efficiency.

MODE FOR CARRYING OUT THE INVENTION

It will be understood that terms or words used in the present disclosure and claims should not be interpreted as having a meaning that is defined in common or in dictionaries, however should be interpreted in consistent with the technical scope of the present invention based on the principle that inventors may appropriately define the concept of the terms to explain the invention at his best method.

Definition of Terms

The term "composition" as used in the present disclosure includes a mixture of materials including the corresponding composition as well as a reaction product and a decomposition product formed from the materials of the corresponding composition.

The term "straight vinyl chloride polymer" as used in the present disclosure may be one type of vinyl chloride polymers and polymerized by suspension polymerization, bulk polymerization, etc., and may refer to a polymer having a porous particle shape in which a large number of pores having a size of tens to hundreds of micrometers, no cohesiveness, and excellent flowability are dispersed.

The term "paste vinyl chloride polymer" as used in the present disclosure may be one type of vinyl chloride polymers and polymerized by microsuspension polymerization, microseed polymerization, emulsion polymerization, etc., and may refer to a polymer having minute particles without pores and a size of tens to thousands of nanometers, cohesiveness, and inferior flowability.

The terms "comprising", and "having" and the derivatives thereof in the present invention, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

Measurement Methods

In the present disclosure, the content analysis of the components in a composition is conducted by gas chromatography measurement using a gas chromatography equipment of Agilent Co. (product name: Agilent 7890 GC, column: HP-5, carrier gas: helium (flow rate of 2.4 ml/min), detector: F.I.D., injection volume: 1 μl, initial value: 70° C./4.2 min, end value: 280° C./7.8 min, program rate: 15° C./min).

In the present disclosure, "hardness" means Shore hardness (Shore "A" and/or Shore "D") at 25° C. and is measured in conditions of 3 T 10 s using ASTM D2240. The hardness may be an index for evaluating plasticization efficiency, and the lower the value is, the better the plasticization efficiency is.

In the present disclosure, "tensile strength" is obtained according to an ASTM D638 method by drawing a specimen in a cross head speed of 200 mm/min (1 T) using a test apparatus of U.T.M (manufacturer: Instron, model name: 4466), measuring a point where the specimen is cut, and calculating according to the following Mathematical Formula 1:

Tensile strength (kgf/cm$^2$)=load value (kgf)/thickness (cm)×width (cm)　　　[Mathematical Formula 1]

In the present disclosure, "elongation rate" is obtained according to an ASTM D638 method by drawing a specimen in a cross head speed of 200 mm/min (1 T) using the U.T.M, measuring a point where the specimen is cut, and calculating according to the following Mathematical Formula 2:

Elongation rate (%)=length after elongation/initial length×100　　　[Mathematical Formula 2]

In the present disclosure, "migration loss" is obtained according to KSM-3156, by which a specimen with a thickness of 2 mm or more is obtained, glass plates are attached onto both sides of the specimen, and a load of 1 kgf/cm$^2$ is applied. The specimen is stood in a hot air circulation type oven (80° C.) for 72 hours, then taken out therefrom and cooled at room temperature for 4 hours. Then, the glass plates attached onto both sides of the specimen are removed, the weights before and after standing a glass plate and a specimen plate in the oven are measured, and the migration loss is calculated according to Mathematical Formula 3 below.

Migration loss (%)={[(weight of initial specimen)−(weight of specimen after standing in oven)]/(weight of initial specimen)}×100　　　[Mathematical Formula 3]

In the present disclosure, "volatile loss" is obtained by processing a specimen at 80° C. for 72 hours and then, measuring the weight of the specimen.

Volatile loss (wt %)={[(weight of initial specimen)−(weight of specimen after processing)]/(weight of initial specimen)}×100　　　[Mathematical Formula 4]

In the case of the various measurement conditions, the details of the conditions of the temperature, the speed of revolution, the time, etc., may be somewhat changed according to situations, and if the conditions are different, a measurement method and its conditions are required to be separately indicated.

Hereinafter, the present invention will be explained in more detail to assist the understanding of the present invention.

According to an embodiment of the present invention, a plasticizer composition comprises a citrate-based composition comprising three or more citrates of the following Formula 1, wherein an alkyl group of the citrate is derived from a C4 alcohol and a C6 alcohol, the C4 alcohol comprises one or more selected from the group consisting of n-butanol and isobutanol, and the C6 alcohol comprises one or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentyl methanol:

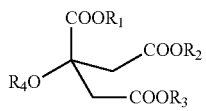

[Formula 1]

in Formula 1,
$R_1$ to $R_3$ are each independently an alkyl group of 4 or 6 carbon atoms, and $R_4$ is hydrogen.

The plasticizer composition may be a product produced by direct esterification reaction of citric acid or a citric acid derivative with a mixture of a C4 alcohol and a C6 alcohol, or by transesterification reaction of a citrate having an alkyl group of 4 (or 6) carbon atoms and a C6 (or C4) alcohol, and in this case, the alcohol applied may be a mixture of the structural isomers or a single material thereof. For example, the C4 alcohol may be a single material of each of n-butanol or isobutanol, or a mixture thereof, and the C6 alcohol may be a single material of each of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentyl methanol, or a mixture of two or more thereof.

In addition, the weight ratio of the C4 alcohol and the C6 alcohol may be 5:95 to 95:5, preferably, 10:90 to 90:10, particularly preferably, 30:70 to 90:10. By controlling the weight ratio of the C4 alcohol and the C6 alcohol in the aforementioned range, a plasticizer composition having excellent balance among physical properties such as plasticization efficiency, mechanical strength, migration resistance, thermal stability, stress resistance and carbonization properties may be provided.

According to an embodiment of the present invention, the plasticizer composition may include a lower alkyl-based citrate including a lower nonhybrid citrate having an alkyl group derived from three C4 alcohols, and a lower hybrid citrate having an alkyl group derived from two C4 alcohols and an alkyl group derived from one C6 alcohol, and a higher alkyl-based citrate including a higher hybrid citrate having an alkyl group derived from two C6 alcohols and an alkyl group derived from one C4 alcohol, and a higher nonhybrid citrate having an alkyl group derived from three C6 alcohols. More particularly, the citrate included in the plasticizer composition includes total four types and may be classified into two large groups of a higher alkyl-based citrate (Formulae 5 to 7 below) in which two or more alkyl groups having a large carbon number of 6 are combined, and a lower alkyl-based citrate (Formulae 2 to 4 below) in which two or more alkyl groups having a small carbon number of 4 are combined. In addition, the lower alkyl-based citrate may be classified into two small groups of a lower nonhybrid citrate (Formula 2 below) in which alkyl groups of 4 carbon atoms are combined with all three ester groups of the citrate, and a lower hybrid citrate (Formulae 3 and 4 below) in which alkyl groups of 4 carbon atoms are combined with two ester groups. Also, the higher alkyl-based citrate may be classified into a higher nonhybrid citrate (Formula 7 below) and a higher hybrid citrate (Formulae 5 and 6 below). Meanwhile, in the case of the citrates represented by Formulae 4 and 6, optical isomers may be present due to the presence of chiral carbon, but in the disclosure, these are not separately treated as different compounds.

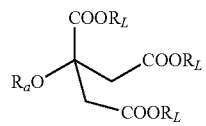

[Formula 2]

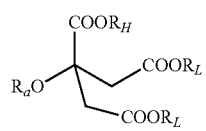

[Formula 3]

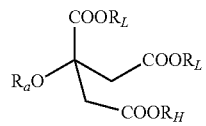

[Formula 4]

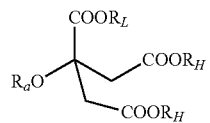

[Formula 5]

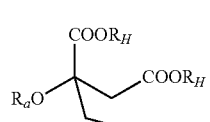

[Formula 6]

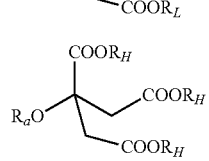

[Formula 7]

In Formulae 2 to 7, $R_L$ is an n-butyl group or an isobutyl group, $R_H$ is an alkyl group derived from 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentyl methanol, and $R_a$ is hydrogen.

Here, the "combined alkyl group" may mean an alkyl group combined with an ester group among three of the citrate.

In addition, the "nonhybrid" or "hybrid" is for differentiate if alkyl radicals combined have the same carbon numbers or are a mixture of alkyl radicals having different carbon numbers, based on the alkyl groups combined with a triester. The case where alkyl groups having the same carbon numbers are combined with three ester groups may be referred to as the "nonhybrid", and the case where mixed alkyl groups having different carbon numbers are combined with three ester groups may be referred to as the "hybrid". In detail, the hybrid and the nonhybrid is differentiated based on the carbon number, for example, the case where only butyl groups having the same carbon numbers are combined, though an n-butyl group and an isobutyl group are mixed together, corresponds to a case with the same carbon number in the disclosure, and means the "nonhybrid".

As described above, the plasticizer composition according to an embodiment of the present invention includes four types as the citrate, and according to the combination of the alkyl groups combined according to each type, excellent effects may be accomplished.

Particularly, according to the features including the balance of alkyl groups between the higher nonhybrid citrate and the lower nonhybrid citrate, the mixing of the hybrid types in a composition, further the degree of the control ratio of the lower alkyl group and the higher alkyl group in total alkyl radicals, and further, in the case where any one alkyl group is derived from a mixture alcohol, the ratio of the presence of a specific branched alkyl radical among branched alkyl groups, the balance of physical properties of plasticization efficiency and migration/loss properties may be adjusted, mechanical properties such as tensile strength and elongation rate and stress resistance may be maintained to an equal or better levels, and marked improvement of heat resistance and light resistance may be achieved due to the interaction of four types of the citrates included in the composition.

Through this, products with further improved loss properties, while removing the environmental issues of the conventional phthalate-based products may be accomplished, the migration and loss properties of the conventional terephthalate-based products may be markedly improved, and products with markedly improved light resistance and heat resistance when compared to the conventional commercial products may be accomplished.

In order to further optimize and make desirable the above-described effects, the conditions of $R_L$ and $R_H$ defined in Formulae 2 to 7 may be important.

According to an embodiment of the present invention, $R_L$ and $R_H$ are an alkyl group of 4 carbon atoms and an alkyl group of 6 carbon atoms, respectively, as defined above.

$R_H$ is an alkyl group of 6 carbon atoms and may be an alkyl group derived from 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol or cyclopentyl methanol.

In addition, preferably, $R_H$ may be derived from the isomer mixture of hexyl alcohols, and the isomer mixture may have the degree of branching of 2.0 or less, preferably, 1.5 or less. Particularly, the degree of branching may be 1.5 or less, 1.3 or less, more preferably, 1.1 or less. In addition, the degree of branching may be 0.1 or more, 0.2 or more, 0.3 or more, most preferably, 0.7 or more. If the degree of branching is greater than 2.0, balance between physical properties may be broken, defects of falling short of one or more evaluation standards of a product may be generated, but in a preferred range of 1.5 or less, the improvement of migration loss and volatile loss as well as mechanical properties may be even further optimized, and balance between physical properties may be excellent.

Here, the degree of branching may mean that how many branched carbons of the alkyl groups combined with a material included in a composition are, and may be determined according to the weight ratio of a corresponding material. For example, if an alcohol mixture is assumed to include 60 wt % of n-hexyl alcohol, 30 wt % of methylpentyl alcohol, and 10 wt % of ethylbutyl alcohol, the number of branched carbons of each alcohol is 0, 1 and 2, respectively, and the degree of branching may be calculated by $[(60\times0)+(30\times1)+(10\times2)]/100$ to give 0.5. Here, the number of branched carbons of cyclopentyl methanol is regarded as 0.

The isomer mixture of hexyl alcohols may include 1-hexanol and 2-methylpentanol. By including 1-hexanol and 2-methylpentanol together in the isomer mixture, balance between physical properties may be maintained, and excellent effects in view of volatile loss may be obtained. Preferably, 3-methylpentanol may be further included, and in this case, there are advantages of improving the balance between physical properties even better.

A branch type hexyl alcohol including 2-methylpentanol may be included in 40 parts by weight or more, 50 parts by weight or more, 60 parts by weight or more, preferably, 65 parts by weight or more, 70 parts by weight or more based on 100 parts by weight of the isomer mixture. To the maximum, all may be the branch type, and may be included in 99 parts by weight or less, 98 parts by weight or less, preferably, 95 parts by weight or less, or 90 parts by weight or less. If the branch type hexyl alcohol is included in the range, the improvement of mechanical properties may be expected.

In addition, the linear alcohol of 1-hexanol may be included in 50 parts by weight or less, 40 parts by weight or less, preferably, 30 parts by weight or less based on 100 parts by weight of the isomer mixture. The 1-hexanol may not be present in the components but may be included in at least 2 parts by weight or more, and in this case, advantages of maintaining balance between physical properties and improving mechanical properties may be obtained.

In addition, the isomer mixture of hexyl alcohols may include 1-hexanol, 1-methylpentanol, 3-methylpentanol and cyclopentyl methanol. Preferably, by further including cyclopentyl methanol, heat loss may be further improved, while maintaining balance between physical properties.

In this case, the cyclopentyl methanol may be 20 parts by weight or less, preferably, 15 parts by weight or less, more preferably, 10 parts by weight or less based on 100 parts by weight of the isomer mixture, or may not be present. The minimum amount for obtaining effects thereby may be 2 parts by weight.

$R_L$ may be an n-butyl group or an isobutyl group, and each of them may be derived from a single alcohol or a mixture alcohol thereof.

According to an embodiment of the present invention, each of the citrates of Formulae 2 to 7 may include two or more structural isomers, because a single alcohol or an isomer mixture of alcohols is applied to $R_L$ and $R_H$ each independently.

For example, in the case of the lower nonhybrid citrate of Formula 2, and in the case where $R_L$ is derived from the isomer mixture of butyl alcohols, two or more structural isomers may be included, and the citrates of Formulae 3 to 6 may also include two or more structural isomers in the same manner. In addition, in the case where $R_H$ is derived from the isomer mixture of hexyl alcohols, each of the citrates of Formulae 3 to 7 may include two or more structural isomers. Accordingly, at least five types of the citrates of Formulae 2 to 7 may include two or more structural isomers.

In the case of including such structural isomers, the improvement of migration properties or loss properties shown according to the degree of branching in the composition may be easily controlled through the control of the degree of branching, and light resistance may become excellent.

The plasticizer composition according to an embodiment of the present invention may control the ratio of each alkyl group for the optimization of the accomplishment of the effects according to the present invention, and the weight ratio of the lower alkyl-based citrate and the higher alkyl-based citrate may be firstly controlled to 1:99 to 99:1, preferably, 2:98 to 95:5, and more preferably, may be controlled to apply a weight ratio of 5:95 to 95:5, and particularly preferably, may be controlled to apply a weight ratio of 10:90 to 95:5, and optimally, a weight ratio of 15:85 to 95:5 may be applied.

In order to improve migration resistance or plasticization efficiency and adjust the balance of volatile loss properties of the higher alkyl-based citrates (Formulae 5 to 7) with the lower alkyl-based citrate which corresponds to the citrates represented by Formulae 2 to 4, a mixture composition of citrates in which alkyl groups derived from a lower alcohol and a higher alcohol are present in hybrid is accomplished, and the weightiness of a total plasticizer composition may be controlled, and the performance improvement of the plasticizer composition may be greatly expected.

In more detail, factors determining the weightiness of the plasticizer composition according to an embodiment of the present invention includes the control of the weight ratio of the lower nonhybrid citrate of Formula 2 and the lower hybrid citrates of Formulae 3 and 4, among the lower alkyl-based citrate, and the weight ratio may be, by nonhybrid to hybrid, 1:99 to 90:10, preferably, 2:98 to 90:10, more preferably, 5:95 to 90:10, particularly preferably, 10:90 to 90:10. Through the control, during performing esterification reaction for preparing the composition, the amount of a product with which a mixture alkyl group is combined may be controlled by controlling the reaction, and through this, the control may play a great role in achieving effects.

In addition, likewise, the control of the weight ratio of the higher nonhybrid of Formula 7 and the higher hybrid of Formulae 5 and 6, among the higher alkyl-based citrate may play a similar role. In this case, the weight ratio may be, by nonhybrid to hybrid, 1:99 to 99:1, preferably, 5:95 to 95:5, more preferably, 10:90 to 90:10, particularly preferably, 50:50 to 90:10. That is, attention is required for improving the effects of the plasticizer composition produced through the suitable control during the reaction and the control of the weight ratio among citrates included in the higher alkyl-based citrate.

If the plasticizer composition according to the present invention is constituted with the components in the above-described ranges, considering the equivalent ratio of materials used as the reactants or the substantial yield of the reaction, a conversion ratio, or the like, the productivity of a preparation process may be increased, the deterioration of the aforementioned mechanical properties such as tensile strength and elongation rate may be prevented, and significant improvement of light resistance may be shown.

According to an embodiment of the present invention, the substituent defined by $R_a$ in the citrates of Formulae 2 to 7 is hydrogen. In this case, excellent effects of plasticization efficiency, migration resistance and light resistance may be achieved, and an absorption rate may be maintained to a suitable level and evaluated excellent.

The method for preparing the plasticizer composition according to an embodiment of the present invention is a known method in the art, and any methods for preparing the above-described plasticizer composition may be applied without specific limitation.

For example, the composition may be prepared through the direct esterification reaction of citric acid or an anhydride thereof with two types (based on carbon number) of alcohols, or through the transesterification reaction of a citrate with one type (based on carbon number) of an alcohol.

The plasticizer composition according to an embodiment of the present invention is a material prepared by suitably performing the esterification reaction, and the preparation method is not specifically limited only if the above-described conditions are acceptable, and if the weight ratio among citrates of each types could be preferably adjusted.

For example, the direct esterification reaction may be performed as following: a step of injecting citric acid or a derivative thereof and a mixture alcohol of two or more types, adding a catalyst and reacting under a nitrogen atmosphere; a step of removing an unreacted raw material; a step of neutralizing (or deactivating) the unreacted raw material and the catalyst; and a step of removing (for example, distillation under a reduced pressure) impurities and filtering.

The alcohol may be a primary alcohol having an alkyl group corresponding to $R_H$ and $R_L$ in Formulae 2 to 7, and a weight ratio between a primary alcohol having the alkyl group of $R_L$ and a primary alcohol having the alkyl group of $R_H$ may act as a major factor determining a component ratio in the composition prepared, and the explanation on the alcohol determining the alkyl group of $R_L$ or $R_H$ is the same as described above, and the explanation thereon will be omitted.

The alcohol may be used in a range of 200 to 900 mol %, 200 to 700 mol %, 200 to 600 mol %, 250 to 600 mol %, or 270 to 600 mol % based on 100 mol % of an acid, and by controlling the amount of the alcohol, the component ratio in a final composition may be controlled.

The catalyst may be, for example, one or more selected from an acid catalyst such as sulfuric acid, hydrochloric acid, phosphoric acid, nitric acid, paratoluenesulfonic acid, methanesulfonic acid, ethanesulfonic acid, propanesulfonic acid, butanesulfonic acid, and alkyl sulfate, a metal salt such as aluminum lactate, lithium fluoride, potassium chloride, cesium chloride, calcium chloride, iron chloride, and aluminum phosphate, a metal oxide such as heteropoly acids, natural/synthetic zeolites, cation and anion exchange resins, and an organometal such as tetra alkyl titanate and the polymers thereof. In a particular embodiment, the catalyst may use tetra alkyl titanate. Preferably, as an acid catalyst having low activation temperature, paratoluenesulfonic acid, methanesulfonic acid, or the like, may be suitable.

The amount used of the catalyst may be different according to the type thereof, and for example, a homogeneous catalyst may be used in a range of 0.01 to 5 wt %, 0.01 to 3 wt %, 1 to 5 wt % or 2 to 4 wt % based on total 100 wt % of the reactants, and a heterogeneous catalyst may be used in a range of 5 to 200 wt %, 5 to 100 wt %, 20 to 200 wt %, or 20 to 150 wt % based on the total weight of the reactants.

In this case, the reaction temperature may be within a range of 100 to 280° C., 100 to 250° C., or 120 to 230° C.

In another embodiment, the transesterification reaction may be reaction of a citrate, and an alcohol having a different alkyl radical from the alkyl radical of the citrate (a lower alkyl alcohol in the case of a citrate combined with a higher alkyl group, and a higher alkyl alcohol in the case of a citrate combined with a lower alkyl group). Here, the alkyl groups of the citrate and alcohol may be exchanged.

"Transesterification" used in the present invention means the reaction of an alcohol and an ester as shown in Reaction 1 below to interchange R″ of the ester with R′ of the alcohol as shown in Reaction 1 below.

[Reaction 1]

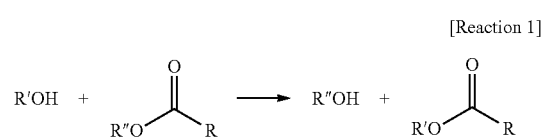

According to an embodiment of the present invention, if the transesterification is carried out, four types of ester compositions may be produced according to four cases: a case where the alkoxide of the alcohol attacks the carbon of three ester groups (RCOOR") which are present in the ester compound; a case where the alkoxide of the alcohol attacks the carbon of two ester groups (RCOOR") which are present in the ester compound; a case where the alkoxide of the alcohol attacks the carbon of one ester group (RCOOR") which is present in the ester compound; and a unreacted case wherein no reaction is performed.

However, in the citrate included in the plasticizer composition according to the present invention, if two ester groups are exchanged or one ester group is exchanged according to the bonding positions of ester groups, two types may be formed for each. Accordingly, the maximum 6 types of compounds may be mixed in a final composition. However, if the alcohol used is an isomer mixture, two types of alkyl groups are present, and structural isomers may be produced diversely.

In addition, the transesterification reaction has advantages of not inducing defects of waste water when compared to esterification reaction between acid-alcohol.

The composition ratio of the mixture prepared through the transesterification reaction may be controlled according to the addition amount of the alcohol. The amount added of the alcohol may be 0.1 to 200 parts by weight, particularly, 1 to 150 parts by weight, more particularly, 5 to 100 parts by weight based on 100 parts by weight of the citrate compound. For reference, the determination of the component ratio in a final composition may be the amount added of the alcohol like in the direct esterification reaction.

That is, in the citrate-based composition, if the amount added of the alcohol increases, the mole fraction of the citrate participating in the transesterification reaction may increase, and in the mixture, the amount of the citrate which is the product may increase, and the amount of the citrate correspondingly present as an unreacted state may tend to decrease.

According to an embodiment of the present invention, the transesterification reaction may be performed at a reaction temperature of 120° C. to 190° C., preferably, 135° C. to 180° C., more preferably, 141° C. to 179° C. for 10 minutes to 10 hours, preferably, 30 minutes to 8 hours, more preferably, 1 to 6 hours. Within the temperature and time ranges, the composition ratio of a final plasticizer composition may be efficiently controlled. In this case, the reaction time may be calculated from a point where the reaction temperature is achieved after elevating the temperature of the reactants.

The transesterification reaction may be performed under an acid catalyst or a metal catalyst, and in this case, the effects of reducing the reaction time may be achieved. The acid catalyst may include, for example, sulfuric acid, methanesulfonic acid or p-toluenesulfonic acid, and the metal catalyst may include, for example, an organometal catalyst, a metal oxide catalyst, a metal salt catalyst, or a metal itself. The metal component may be, for example, any one selected from the group consisting of tin, titanium and zirconium, or a mixture of two or more thereof.

In addition, a step of removing unreacted alcohol and reaction by-products by distillation may be further included after the transesterification reaction. The distillation may be, for example, a two-step distillation by which the alcohol and the by-products are individually separated using the difference of the boiling points. In another embodiment, the distillation may be mixture distillation. In this case, effects of relatively stable securing of an ester-based plasticizer composition in a desired composition ratio may be achieved. The mixture distillation means distillation of the unreacted alcohol and the by-products simultaneously.

According to another embodiment of the present invention, a resin composition including the aforementioned plasticizer composition and a resin is provided.

The resin may use resins well-known in the art. For example, a mixture of one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, polylactic acid, natural rubber, synthetic rubber and thermoplastic elastomer may be used, without limitation.

The plasticizer composition may be included in 5 to 150 parts by weight, preferably, 5 to 130 parts by weight, or 10 to 120 parts by weight based on 100 parts by weight of the resin.

Generally, the resin using the plasticizer composition may be prepared into a resin product through a melt processing or a plastisol processing, and a resin by the melt processing and a resin from the plastisol processing may be produced differently according to each polymerization method.

For example, in the case of using a vinyl chloride polymer in a melt processing, solid phase resin particles having a large average particle diameter are prepared by suspension polymerization, or the like and used, and the vinyl chloride polymer is referred to as a straight vinyl chloride polymer. In the case of using a vinyl chloride polymer in a plastisol processing, a sol state resin as minute resin particles are prepared by emulsion polymerization, or the like and used, and this vinyl chloride polymer is referred to as a paste vinyl chloride resin.

In the case of the straight vinyl chloride polymer, a plasticizer may preferably be included in a range of 5 to 80 parts by weight based on 100 parts by weight of the polymer, and in the case of the paste vinyl chloride polymer, the plasticizer may preferably be included in a range of 40 to 120 parts by weight based on 100 parts by weight of the polymer.

The resin composition may further include a filler. The filler may be 0 to 300 parts by weight, preferably, 50 to 200 parts by weight, more preferably, 100 to 200 parts by weight based on 100 parts by weight of the resin.

The filler may use fillers well-known in the art and is not specifically limited. For example, the filler may be a mixture of one or more types selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, the resin composition may further include other additives such as a stabilizer as necessary. Each of the other additives such as the stabilizer may be, for example, 0 to 20 parts by weight, preferably, 1 to 15 parts by weight based on 100 parts by weight of the resin.

The stabilizer may use, for example, a calcium-zinc-based (Ca—Zn-based) stabilizer such as a composite stearate of calcium-zinc or a barium-zinc-based (Ba—Zn-based) stabilizer, but is not specifically limited.

The resin composition may be applied to both a melt processing and a plastisol processing as described above, and a calendaring processing, an extrusion processing, or an injection processing may be applied to the melt processing, and a coating processing, or the like may be applied to the plastisol processing.

EXAMPLES

Hereinafter, embodiments will be explained in detail to particularly explain the present invention. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

Examples 1 to 8

To a reactor equipped with a stirrer, a condenser and a decanter, 380 g of citric anhydride, 40 g of n-butanol, 760 g of an isomer mixture of hexyl alcohols including 1-hexanol, 2-methylpentanol and 3-methylpentanol in a weight ratio of 10:40:50, and 2 g of tetrabutyl titanate (TnBT) were injected, and under a nitrogen atmosphere, esterification reaction was performed. After finishing the reaction, unreacted alcohol was removed. After that, to the composition from which the unreacted alcohol was removed, an aqueous alkaline solution was added to neutralize and wash the catalyst and the composition, and a purification process for removing unreacted alcohol and water was performed to obtain the composition of Example 1, including tri(n-butyl) citrate, di(n-butyl)(hexyl) citrate, di(hexyl)(n-butyl) citrate and tri(hexyl) citrate in 0.1 wt %, 2.5 wt %, 7.2 wt % and 90.2 wt %, respectively.

In the reaction, the type and injection amounts of the reactants were controlled, and the compositions of Examples 2 to 8, having the compositions shown in Table 1 below were prepared.

Meanwhile, "hexyl" in the di(n-butyl)(hexyl) citrate, di(hexyl)(n-butyl) citrate and tri(hexyl) citrate described in the Examples means a hexyl group derived from the isomer mixture of hexyl alcohols used in the reaction, and includes all of 1-hexyl, 2-methylpentyl and 3-methylpentyl.

Comparative Example 1

Dioctyl phthalate (DOP, LG Chem,) was used as a plasticizer.

Comparative Example 2

Diisononyl phthalate (DINP, LG Chem,) was used as a plasticizer.

Comparative Example 3

Di(2-ethylhexyl) terephthalate (GL300, LG Chem,) was used as a plasticizer.

Comparative Examples 4 to 6

In Example 1, only 2-ethylhexanol was injected instead of injecting the isomer mixture of n-butanol and hexyl alcohol, as the alcohol and reacted, and after finishing the reaction, unreacted alcohol was removed. To the reaction product from which the unreacted alcohol was removed, 180 g of acetic anhydride was injected, followed by reacting for 2 hours to complete acetylation. Then, to the acetylation completed composition, an aqueous alkaline solution was added to neutralize and wash the catalyst and the composition, and a purification process for removing unreacted alcohol and water was performed to obtain acetyl tri(2-ethylhexyl) citrate of Comparative Example 4.

In Comparative Examples 5 and 6, the alcohol in Comparative Example 4 was changed to those shown in Table 1 below.

Comparative Examples 7 to 9

Tri(2-ethylhexyl) citrate of Comparative Example 6 was obtained by the same reaction as in Example 1 except for injecting only 2-ethylhexanol instead of injecting the isomer mixture of n-butanol and hexyl alcohol, as the alcohol and reacting.

In Comparative Examples 8 and 9, the alcohol in Comparative Example 7 was changed to those shown in Table 1 below.

Examples 10 to 11

To a reactor equipped with a stirrer, a condenser and a decanter, 380 g of citric anhydride, 1014 g of 2-ethylhexanol and 2 g of tetrabutyl titanate (TnBT) were injected, and under a nitrogen atmosphere, esterification reaction was performed to prepare tri(2-ethylhexyl)citrate.

To a reactor equipped with a stirrer, a condenser and a decanter, 1000 g of the tri(2-ethylhexyl) citrate thus prepared and 300 g of n-butanol (300 parts by weight based on 100 parts by weight of TEHC) were injected, and under a nitrogen atmosphere and at a reaction temperature of 160° C., transesterification reaction was performed for 2 hours. After that, unreacted alcohol was removed, and 180 g of acetic anhydride was additionally injected, followed by reacting for 2 hours to complete acetylation. As a result, the composition of Comparative Example 10, including acetyl tri(n-butyl) citrate, acetyl di(n-butyl)(2-ethylhexyl) citrate, acetyl di(2-ethylhexyl)(n-butyl) citrate and acetyl tri(2-ethylhexyl) citrate in 4.2 wt %, 25.2 wt %, 45.3 wt % and 25.3 wt %, respectively, was obtained.

In the reaction, the type and injection amounts of the reactants were controlled, and the composition of Comparative Example 11, having the composition shown in Table 1 below was prepared.

Comparative Examples 12 to 13

The composition of Comparative Example 12 was prepared by the same reaction as in Comparative Example 10 except for not performing the acetylation, and the composition of Comparative Example 13 was prepared by the same reaction as in Comparative Example 11 except for not performing the acetylation.

TABLE 1

| Division | Lower alcohol | Higher alcohol | Presence of acetyl | Product composition (wt %) Lower nonhybrid | Lower hybrid | Higher hybrid | Higher nonhybrid | Weight ratio of injected alcohols |
|---|---|---|---|---|---|---|---|---|
| Example 1 | n-butanol | C6 isomer mixture | X | 0.1 | 2.5 | 7.2 | 90.2 | C4:C6 = 5:95 |
| Example 2 | n-butanol | C6 isomer mixture | X | 0.5 | 5.4 | 16.5 | 77.6 | C4:C6 = 10:90 |
| Example 3 | n-butanol | C6 isomer mixture | X | 1.8 | 15.6 | 43.8 | 38.8 | C4:C6 = 30:70 |
| Example 4 | n-butanol | C6 isomer mixture | X | 8.7 | 33.5 | 42.0 | 15.8 | C4:C6 = 50:50 |
| Example 5 | n-butanol | C6 isomer mixture | X | 40.1 | 38.4 | 18.5 | 3.0 | C4:C6 = 70:30 |
| Example 6 | n-butanol | C6 isomer mixture | X | 82.1 | 10.8 | 6.1 | 1.0 | C4:C6 = 90:10 |
| Example 7 | iso-butanol | C6 isomer mixture | X | 2.0 | 16.8 | 45.2 | 36.0 | C4:C6 = 30:70 |
| Example 8 | iso-butanol | C6 isomer mixture | X | 8.0 | 35.2 | 45.8 | 11.0 | C4:C6 = 50:50 |
| Comparative Example 1 | | DOP | — | — | — | — | — | — |
| Comparative Example 2 | | DINP | — | — | — | — | — | — |
| Comparative Example 3 | | DOTP | — | — | — | — | — | — |
| Comparative Example 4 | | 2-ethylhexanol | 0 | — | — | — | — | — |
| Comparative Example 5 | | 1-hexanol | 0 | — | — | — | — | — |
| Comparative Example 6 | | n-butanol | 0 | — | — | — | — | — |
| Comparative Example 7 | | 2-ethylhexanol | X | — | — | — | — | — |
| Comparative Example 8 | | 1-hexanol | X | — | — | — | — | — |
| Comparative Example 9 | | n-butanol | X | — | — | — | — | — |
| Comparative Example 10 | n-butanol | 2-ethylhexanol | 0 | 4.2 | 25.2 | 45.3 | 25.3 | C4 30 wt % of TEHC |
| Comparative Example 11 | n-butanol | isononanol | 0 | 6.0 | 26.8 | 46.8 | 20.4 | C4 30 wt % of TINC |
| Comparative Example 12 | n-butanol | 2-ethylhexanol | X | 4.2 | 25.2 | 45.3 | 25.3 | C4 30 wt % of TEHC |
| Comparative Example 13 | n-butanol | isononanol | X | 6.0 | 26.8 | 46.8 | 20.4 | C4 30 wt % of TINC |

In Table 1 above, "C4 30% of TEHC" means 30 parts by weight of C4 alcohol in contrast to 100 parts by weight of TEHC, and similar description may be interpreted in the same manner.

Experimental Example 1: Sheet Performance Evaluation

By using the plasticizers of the Examples and the Comparative Examples, specimens were manufactured according to ASTM D638 and the prescription and manufacturing conditions below.
(1) Prescription: 100 parts by weight of a straight vinyl chloride polymer (LS100), 50 parts by weight of a plasticizer and 3 parts by weight of a stabilizer (BZ-153T)
(2) Mixing: mixing at 98° C. in 700 rpm
(3) Manufacture of specimen: manufacturing 1 T, 2 T and 3 T sheets by processing at 160° C. for 4 minutes by a roll mill, and at 180° C. for 2.5 minutes (low pressure) and 2 minutes (high pressure) by a press
(4) Test items
1) Hardness: Shore hardness (Shore "A" and "D") at 25° C. was measured using a 3 T specimen for 10 seconds using ASTM D2240. The plasticization efficiency was assessed excellent if the value was small.
2) Tensile strength: By an ASTM D638 method, a specimen was drawn in a cross-head speed of 200 mm/min using a test apparatus of U.T.M (manufacturer: Instron, model name: 4466), and a point where the 1 T specimen was cut was measured. The tensile strength was calculated as follows.

Tensile strength (kgf/cm$^2$)=load value (kgf)/thickness (cm)×width (cm)

3) Elongation rate measurement: By an ASTM D638 method, a specimen was drawn in a cross-head speed of 200 mm/min using a test apparatus of U.T.M, and a point where the 1 T specimen was cut was measured. The elongation rate was calculated as follows.

Elongation rate (%)=length after elongation/initial length×100

4) Migration loss measurement: According to KSM-3156, a specimen with a thickness of 2 mm or more was obtained, glass plates were attached onto both sides of the 1 T specimen, and a load of 1 kgf/cm$^2$ was applied. The specimen was stood in a hot air circulation type oven (80° C.) for 72 hours and then taken out and cooled at room temperature for 4 hours. Then, the weights of the specimen from which glass plates attached onto both sides thereof were removed, were measured before and after standing in the oven, and the migration loss was calculated as follows.

Migration loss (%)={(initial weight of specimen at room temperature−weight of specimen after standing in oven)/initial weight of specimen at room temperature}×100

5) Volatile loss measurement: The specimen manufactured was processed at 80° C. for 72 hours, and the weight of the specimen was measured.

Volatile loss (wt %)=weight of initial specimen−(weight of specimen after processing at 80° C. for 72 hours)/weight of initial specimen×100

6) Stress test (stress resistance): A specimen with a thickness of 2 mm in a bent state was stood at 23° C. for 168 hours, and the degree of migration (degree of oozing) was observed. The results were recorded as numerical values, and excellent properties were shown if the quantity was closer to 0.

(5) Evaluation results

The evaluation results on the test items are shown in Table 2 and Table 3 below.

TABLE 2

|  | Hardness | | Tensile | | Migration | Volatile |
|  | Shore A | Shore D | strength (kgf/cm²) | Elongation rate (%) | loss (%) | loss (%) |
| --- | --- | --- | --- | --- | --- | --- |
| Example 1 | 84.2 | 37.3 | 204.6 | 305.8 | 1.60 | 1.18 |
| Example 2 | 83.9 | 37.1 | 210.3 | 317.6 | 1.51 | 1.20 |
| Example 3 | 83.0 | 36.4 | 205.7 | 310.9 | 1.28 | 1.41 |
| Example 4 | 82.3 | 36.0 | 206.7 | 318.7 | 1.01 | 1.60 |
| Example 5 | 81.4 | 35.6 | 211.9 | 308.1 | 0.87 | 1.80 |
| Example 6 | 80.5 | 35.0 | 217.3 | 310.6 | 0.73 | 1.92 |
| Example 7 | 83.1 | 36.4 | 204.6 | 314.8 | 1.20 | 1.50 |
| Example 8 | 82.2 | 35.9 | 210.8 | 315.7 | 0.92 | 1.78 |
| Comparative Example 1 | 84.4 | 37.6 | 194.9 | 312.6 | 1.34 | 1.66 |
| Comparative Example 2 | 86.7 | 39.9 | 208.0 | 324.7 | 2.05 | 0.81 |
| Comparative Example 3 | 88.7 | 41.2 | 217.1 | 326.4 | 5.40 | 0.86 |
| Comparative Example 4 | 95.0 | 44.7 | 210.2 | 264.5 | 3.57 | 0.77 |
| Comparative Example 5 | 86.8 | 40.3 | 214.5 | 302.1 | 1.86 | 0.85 |
| Comparative Example 6 | 82.4 | 37.5 | 200.8 | 310.0 | 1.56 | 3.42 |
| Comparative Example 7 | 92.4 | 45.8 | 204.5 | 298.7 | 2.40 | 0.86 |
| Comparative Example 8 | 84.7 | 37.7 | 199.8 | 311.8 | 1.02 | 1.00 |
| Comparative Example 9 | 80.2 | 34.8 | 165.3 | 284.6 | 1.00 | 6.57 |
| Comparative Example 10 | 87.7 | 40.5 | 205.4 | 310.8 | 2.45 | 1.02 |
| Comparative Example 11 | 90.8 | 43.5 | 201.2 | 304.9 | 2.74 | 0.84 |
| Comparative Example 12 | 84.4 | 37.3 | 198.3 | 310.2 | 1.75 | 1.36 |
| Comparative Example 13 | 87.5 | 40.4 | 195.7 | 305.8 | 2.24 | 1.10 |

TABLE 3

|  | Stress migration | | |
|  | 1 day | 2 days | 3 days |
| --- | --- | --- | --- |
| Example 1 | 0 | 0 | 0 |
| Example 2 | 0 | 0 | 0 |
| Example 3 | 0 | 0 | 0 |
| Example 4 | 0 | 0 | 0 |
| Example 5 | 0 | 0 | 0 |
| Example 6 | 0 | 0 | 0 |
| Example 7 | 0 | 0 | 0 |
| Example 8 | 0 | 0 | 0 |
| Comparative Example 1 | 0.5 | 0.5 | 0.5 |
| Comparative Example 2 | 1.0 | 1.0 | 0.5 |
| Comparative Example 3 | 2.5 | 3.0 | 3.0 |
| Comparative Example 4 | 3.0 | 2.5 | 2.5 |
| Comparative Example 5 | 2.5 | 2.0 | 1.5 |
| Comparative Example 6 | 1.5 | 1.0 | 0.5 |
| Comparative Example 7 | 3.0 | 3.0 | 3.0 |
| Comparative Example 8 | 0.5 | 0.5 | 0 |
| Comparative Example 9 | 0.5 | 0.5 | 0 |
| Comparative Example 10 | 2.0 | 2.0 | 1.5 |
| Comparative Example 11 | 3.0 | 3.0 | 2.5 |
| Comparative Example 12 | 2.0 | 2.0 | 1.0 |
| Comparative Example 13 | 2.5 | 3.0 | 2.0 |

Referring to Table 2 and Table 3, it could be confirmed that cases of Examples 1 to 8, in which the plasticizer composition according to an embodiment of the present invention was applied, showed largely improved plasticization efficiency, tensile strength and migration loss and excellent stress resistance when compared to Comparative Examples 1 to 3, which were used as the conventional products.

In addition, Comparative Examples 4 to 6 correspond to cases of applying the citrates prepared by not hybridizing the alkyl groups of the citrates using two or more types of alcohols but by using one type of alcohol and using acetylated citrates, and it could be found that most physical properties were shown poor in contrast to Examples 1 to 8, particularly, very poor stress resistance was confirmed, and there were defects of generating large deviation of physical properties according to the number of carbon.

Also, Comparative Examples 7 to 10 correspond to cases of applying the citrates prepared by not hybridizing the alkyl groups of the citrates using two or more types of alcohols but by using one type of alcohol and not performing acetylation different from Comparative Examples 4 to 6. Comparative Examples 7 to 10 also showed poor in most physical properties like Comparative Examples 4 to 6 when compared to Examples 1 to 8, and large deviation of physical properties according to the number of carbon was shown.

In addition, in cases of Comparative Examples 10 and 11, in which alcohols of C8 or C9, which have greater carbon number of a higher alcohol than C6, were applied, and acetylation was performed, the plasticization efficiency, tensile strength, elongation rate and migration loss were poor in contrast to the Examples, and stress resistance was also poor. In addition, the cases of Comparative Examples 12 and 13, which correspond to Comparative Examples 10 and 11 without performing acetylation, also were poor in contrast to the Examples in view of tensile strength, elongation rate and stress resistance.

Through this, it could be confirmed that the hybridization of the alkyl groups of a citrate by using two or more types of alcohols and using C4 and C6 alcohols in combination, is required in applying the citrate in a plasticizer as in the Examples of the present invention, and in this case, a plasticizer having excellent performance could be achieved.

The invention claimed is:

1. A plasticizer composition comprising a citrate-based composition comprising three or more citrates of the following Formula 1, wherein

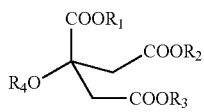

Formula 1 in Formula 1, $R_1$ to $R_3$ are each independently an alkyl group of 4 or 6 carbon atoms, and $R_4$ is hydrogen,
the alkyl group is derived from a C4 alcohol or a C6 alcohol,
the C4 alcohol comprises one or more selected from the group consisting of n-butanol and isobutanol, and
the C6 alcohol comprises one or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol, and cyclopentyl methanol.

2. The plasticizer composition according to claim 1, wherein the citrate-based composition comprises:
a lower alkyl-based citrate comprising
a lower nonhybrid citrate having three alkyl groups that are each derived from the C4 alcohol, and
a lower hybrid citrate having two alkyl groups that are each derived from the C4 alcohol and an alkyl group derived from the C6 alcohol; and
a higher alkyl-based citrate comprising
a higher hybrid citrate having two alkyl groups that are each derived from the C6 alcohol and an alkyl group derived from the C4 alcohol, and
a higher nonhybrid citrate having three alkyl groups that are each derived from the C6 alcohol.

3. The plasticizer composition according to claim 1, wherein a weight ratio of the C4 alcohol and the C6 alcohol is from 5:95 to 95:5.

4. The plasticizer composition according to claim 1, wherein the C6 alcohol comprises 1-hexanol, 2-methylpentanol and 3-methylpentanol.

5. The plasticizer composition according to claim 4, wherein the C6 alcohol further comprises cyclopentyl methanol.

6. The plasticizer composition according to claim 1, wherein the C6 alcohol comprises 1-hexanol, and one or more selected from the group consisting of 2-methylpentanol, 3-methylpentanol, and cyclopentyl methanol, and
the 1-hexanol is present in 60 wt % or less based on a total weight of the C6 alcohol.

7. The plasticizer composition according to claim 2, wherein a weight ratio of the lower alkyl-based citrate and the higher alkyl-based citrate is from 1:99 to 99:1.

8. The plasticizer composition according to claim 7, wherein the weight ratio of the lower alkyl-based citrate and the higher alkyl-based citrate is from 2:98 to 95:5.

9. The plasticizer composition according to claim 2, wherein a weight ratio of the lower nonhybrid citrate and the lower hybrid citrate in the lower alkyl-based citrate is from 2:98 to 90:10.

10. The plasticizer composition according to claim 2, wherein a weight ratio of the higher nonhybrid citrate and the higher hybrid citrate in the higher alkyl-based citrate is from 5:95 to 95:5.

11. A resin composition, comprising:
100 parts by weight of a resin; and from 5 to 150 parts by weight of the plasticizer composition of claim 1.

12. The resin composition according to claim 11, wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, polylactic acid, natural rubber, and synthetic rubber.

* * * * *